United States Patent
Doezema et al.

[11] Patent Number: 6,139,759
[45] Date of Patent: Oct. 31, 2000

[54] METHOD OF MANUFACTURING SILICIDED SILICON MICROTIPS FOR SCANNING PROBE MICROSCOPY

[75] Inventors: Lambert A. Doezema, San Antonio, Tex.; Philip V. Kaszuba, Essex Junction, Vt.; Leon Moszkowicz, Stowe, Vt.; James M. Never, Essex Junction, Vt.; James A. Slinkman, Montpelier, Vt.

[73] Assignee: International Business Machines Corporation, Armonk, N.Y.

[21] Appl. No.: 09/256,261

[22] Filed: Feb. 23, 1999

Related U.S. Application Data

[62] Division of application No. 08/889,643, Jul. 8, 1997, abandoned.

[51] Int. Cl.[7] ...................................................... C25F 3/08
[52] U.S. Cl. .................................. 216/11; 216/13; 257/10
[58] Field of Search ........................... 216/11, 13; 257/10

[56] References Cited

U.S. PATENT DOCUMENTS

| | | |
|---|---|---|
| 4,001,685 | 1/1977 | Roch . |
| 4,956,923 | 9/1990 | Pettingell et al. . |
| 5,065,103 | 11/1991 | Slinkman et al. . |
| 5,116,462 | 5/1992 | Bartha et al. . |
| 5,155,715 | 10/1992 | Ueyema et al. . |
| 5,171,992 | 12/1992 | Clabes et al. . |
| 5,189,377 | 2/1993 | Rhoades et al. . |
| 5,210,410 | 5/1993 | Barrett . |
| 5,260,926 | 11/1993 | Kuroda et al. . |
| 5,267,471 | 12/1993 | Abraham et al. . |
| 5,272,443 | 12/1993 | Winchip et al. . |
| 5,321,352 | 6/1994 | Takebuchi . |
| 5,357,109 | 10/1994 | Kusumoto . |
| 5,381,101 | 1/1995 | Bloom et al. . |
| 5,399,232 | 3/1995 | Albrecht et al. . |
| 5,399,983 | 3/1995 | Nagasawa . |
| 5,450,746 | 9/1995 | Howard . |
| 5,455,419 | 10/1995 | Bayer et al. . |
| 5,488,305 | 1/1996 | Bloom et al. . |
| 5,509,300 | 4/1996 | Chamberlin et al. . |
| 5,592,736 | 1/1997 | Akram et al. . |
| 5,844,251 | 12/1998 | MacDonald et al. . |

OTHER PUBLICATIONS

T. Hochwitz et al., "Capacitive Effects on Quantitative Dopant Profiling with Scanned Electrostatic Force Microscopes," J. Vac. Sci, Technol. B, vol. 14, No. 1, Jan. Feb. 1996, pp. 457–462.

T. Hochwitz et al., "DRAM Failure Analysis with the Force–Based Scanning Kelvin Probe," 1995 IEEE International Reliability Physics Proceedings. 33rd Annual (Cat. No. 95CH3471-0), 1995, pp. 217–222.

J. S. McMurray et al., "Direct Comparison of 2–Dimensional Dopant Profiles by Scanning Capacitance Microscopy with TSUPREM4 Process Simulation," 4th International Workshop—Measur., Char., & Modeling of Ultra–Shallow Doping Profiles, Apr. 1997, pp. 54.1–54.9.

(List continued on next page.)

*Primary Examiner*—Randy Gulakowski
*Assistant Examiner*—Allan Olsen
*Attorney, Agent, or Firm*—Ratner & Prestia; Howard J. Walter, Jr.

[57] ABSTRACT

A micromechanical sensor probe for a scanned-probe tool comprising a silicon probe and a coating of a refractory metal silicide formed at least on the tip of the probe. Titanium silicide is preferred. A method for manufacturing such a probe includes the steps of, first, providing a silicon cantilever and tip combination and, second, forming a refractory metal silicide on at least the tip of the cantilever and tip combination. This second step of the method includes removing any remnant oxide from the tip, stabilizing the cantilever and tip combination on a carrier, depositing a refractory metal on the silicon tip, heating the cantilever and tip combination in an ambient free of oxygen to react chemically the refractory metal on and the silicon of the tip, selectively etching any unreacted refractory metal from the tip, and annealing the cantilever and tip combination in an ambient free of oxygen. The method may also include, as a final step, removing any unreacted refractory metal from the tip.

17 Claims, 17 Drawing Sheets-

OTHER PUBLICATIONS

C. C. Williams et al., "Lateral Dopant Profiling with 200 nm Resolution by Scanning Capacitance Microscopy," Appl. Phys. Lett. 55 (16), pp. 1662–1664 (1989).

Y. Huang et al., "Quantitative Two–Dimensional Dopant Profile Measurement and Inverse Modeling by Scanning Capicitance Microscopy," Appl. Phys. Lett. 66 (3), pp. 344–346 (1995).

Hans–Werner Fink, "Mono–Atomic Tips for Scanning Tunneling Microscopy," IBM J. Res. Develop., vol. 30, No. 5, Sep. 1986, pp. 460–465.

Cascade Microtech, Inc. Brochure, "DCP 100–Series—Precision DC Probes WIth Replaceable Tips," Copyright 1995 Cascade Microtech, Inc.

Cascade Microtech, Inc. Brochure, Alessi—REL–6100 Probe Station, Copyright 1995 Cascade Microtech, Inc.

J. J. Kopanski et al., "Scanning Capacitance Microscopy Measurement of 2–D Dopant Profiles Across Junctions," 4th International Workshop—Measur., Char., & Modeling of Ultra–Shallow Doping Profiles, Apr. 1997, pp. 53.1–53.9.

M. Nonnemacher et al., "Kelvin Probe Force Microscopy," Appl. Phys. Lett. 58 (25), pp. 2921–2923 (1991).

J. R. Matey & J. Blanc, "Scanning Capacitance Microscopy," J. Appl. Phys. 57 (5), pp. 1437–1444 (1985).

J. Brugger et al., "Silicon Cantilevers and Tips for Scanning Force Microscopy," Sensors and Actuators A, vol. 34, 1992, pp. 193–200.

M. Nonnenmacher et al., "Scanning Force Microscopy with Micromachined Silicon Sensors," J. Vac. Sci. Tech. B, vol. 9, 1991, pp. 1358–1362.

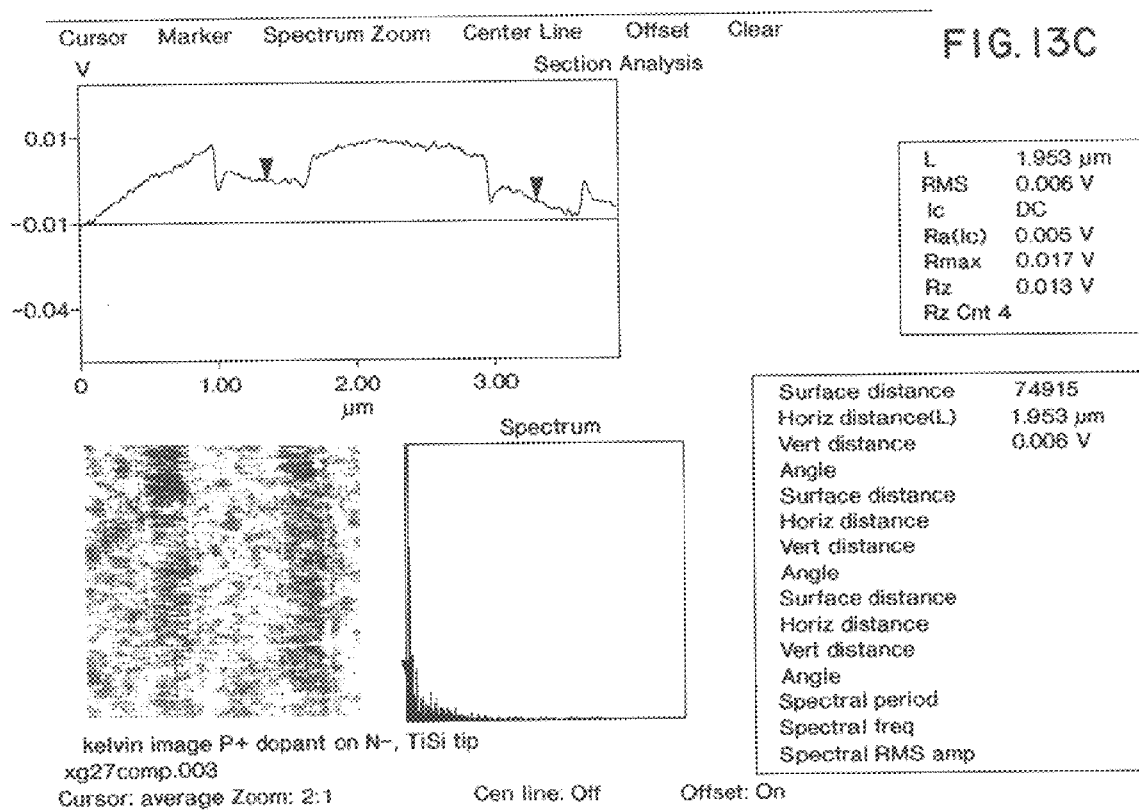

METHOD OF MANUFACTURING SILICIDED SILICON MICROTIPS FOR SCANNING PROBE MICROSCOPY

This application is a divisional of U.S. patent application Ser. No. 08/889,643, filed on Jul. 8, 1997, now abandoned.

FIELD OF THE INVENTION

The present invention relates generally to scanning probe microscopy and, more particularly, to an improved atomic microtip component of the nanometer scale probe for use with a scanning probe microscope and to a manufacturing method for that microtip.

BACKGROUND OF THE INVENTION

A number of techniques have been developed for characterizing the surface topography, voltage potential, and capacitance distribution of semiconductor devices. These techniques have been developed in response to advances in semiconductor technology, in which the dimensions of processed semiconductor devices are becoming ever smaller. This diminution in device scale renders both physical and electrical analyses more difficult to perform. Traditional methods of electrical measurement, such as direct mechanical probing, tend to become difficult or impossible to perform at such reduced scale.

Specifically, present-day very large scale integrated (VLSI) circuit technology demands accurate knowledge of the spatial extent in three dimensions of active impurity dopants which have been incorporated into the discrete device elements. The devices are predominantly either bipolar or metal oxide semiconductor field effect transistors (MOSFET's), diodes, or capacitors. A typical device occupies an area on the order of 10 $\mu m^2$. The active region of such a device, where most current flows, is engineered by incorporating dopants, for example arsenic, boron, or phosphorous, in a concentration range of $10^{15}$ to $10^{20}$ $cm^{-3}$. It is necessary to control the variation, or profile, of impurity dopants to a spatial resolution of 100 nm (1 $\mu m$ equals 1,000 nm) or less for high yield in manufacture and for reliability of the circuitry in the field. Lack of precision related to the incorporation of impurity dopants can result in a proliferation of undesirable defects during later steps in the manufacturing process, less than adequate device performance, or even device failure. Such high precision in the characterization of dopant profiles on a microscopic scale is, clearly, highly desirable for efficient device design. In order to achieve predictability in device behavior, one must be able to measure accurately the dopant profiles and feed this information back into the design cycle. It has been impossible to achieve this high precision, except in one dimension, either in the design or manufacturing phases of VLSI components on the submicron scale. The need exists, therefore, for an instrument able to fulfill all of the above criteria for dopant density profiling in two and three dimensions.

Hence, efforts have been directed to devising electrical analysis instruments which are non-destructive, do not contact the sample, and exhibit improved spatial resolution. Included among recently developed electrical analysis instruments are microscopes based upon local interactions between a probe having an atomically sharp tip and a sample surface. Such interactions include electron tunneling, atomic force, magnetic force, as well as thermal, optical, and electrostatic coupling. Scanning probe microscopy refers generally to a class of high resolution techniques for studying surfaces at or near atomic resolution. Several different techniques which produce these results have been described in the prior art.

One of the first such techniques is scanning tunneling microscopy. In the scanning tunneling microscope (STM), a sharpened tip is maneuvered to, and held in electrical contract with (circa 0.1 to 1 nm above), a conducting sample surface and biased to produce a current between the tip and the surface. The tip is sufficiently close to the surface that there is an overlap between the electron clouds of the atom at the probe tip and of the nearest atom of the sample. When a small voltage is applied to the tip, electrons "tunnel" across the gap generating a small tunneling current. The strength of that current is very sensitive to the width of the gap. Piezoelectric controls are used to control the motion of the probe and to move it back-and-forth across the sample while maintaining a constant gap between its tip and the sample surface. The variations in voltage applied to maintain the probe properly positioned over the surface are electronically translated into an image of the surface topography. The tip and the sample in this technique must be electrically conductive to allow current flow between them, which limits the application of the technique. Another limitation is that the STM is sensitive only to the charge density at the surface of the sample.

The invention of STM led to the development of a family of new scanning probe microscopes, one of which is the atomic force microscope (AFM) which negates the need for a conducting sample. In its first implementation, the AFM relied upon the repulsive forces generated by the overlap of the electron cloud at the surface of the tip with electron clouds of surface atoms within the sample. A typical AFM microprobe tip is fabricated on the end of a mechanically compliant cantilever so that the axes of the cantilever and the tip are substantially perpendicular to one another. The process most widely used to form the cantilever-tip system involves masking and etching crystalline silicon, a process which is described in the prior art. The silicon cantilever is typically 100 $\mu m$ long and 1 or 2 $\mu m$ thick. The tip is usually tetrahedral in shape and 2 to 3 $\mu m$ both in height and along the base of the tetrahedron, which is integral with the cantilever, having been etched from it. The silicon tip senses the sample surface as it comes into close proximity (on the order of 3 nm) with the sample surface as the cantilever oscillates mechanically above the surface near the cantilever longitudinal resonance frequency (which is usually several tens of kHz).

This is because, as described in the prior art, the repulsive (van der waals) forces between the tip and surface of the sample cause deflections of the cantilever resulting in deviations from the cantilever mechanical resonance. These deviations are sensed as a voltage and fed back to a piezo-transducer which adjusts the position of the tip-cantilever relative to the sample surface so as to bring the cantilever back to its operating resonance. Thus, changes in the resonance of the tip-cantilever system provide a sensitive measure of the deflections of the cantilever, and hence of the forces between the sample surface and the tip. Although a number of methods have been used to measure the movement of the cantilever and tip combination, measurements have been made recently by optical methods including a laser beam. The reflected laser beam is detected and enables cantilever movements to be converted to imaging signals.

Another variant of the AFM with which the present invention can be used is the electrostatic-force microscope (EFM) where the vibrating, conductive probe is charged electrically by application of an electric potential difference to it relative to the sample surface. When the EFM is capacitively coupled, via a resonant tank circuit and lock-in amplifier as taught in the prior art, to the vertical axis (i.e., the z-axis) piezo-transducer which controls the tip height above the sample surface, the EFM is known as a scanning capacitance microscope (SCM). Furthermore, if the SCM piezo-transducer feedback voltage is dynamically adjusted to force the tip-to-sample potential difference to be zero, the SCM is operating as a scanning Kelvin probe microscope (SKPM) as is taught in the prior art. In this case, the measured quantity is referred to as Kelvin voltage or, equivalently, contact potential difference. Another form of AFM is a magnetic-force microscope (MFM). In an MFM, a magnetized nickel or iron probe is substituted for the tungsten or silicon needles used with other AFM's. When the vibrating probe is brought near a magnetic sample, the tip "feels" a magnetic force that changes its resonant frequency and hence its vibration amplitude. The MFM traces magnetic-field patterns emanating from the sample.

In summary, both SCM and SKPM have been shown in the prior art to be effective techniques for the measurement of engineered, impurity dopant profiles and fixed charges and for ensuring local electrical integrity for product quality in production, sub-micron VLSI devices. Quantitative two-dimensional dopant profiling for calibration of process simulators on a nanometer scale has been identified, in fact, as one of the significant needs of the semiconductor industry. The development of SCM as a profiling tool has been spurred by its inclusion in the Semiconductor Industry Association's National Technology Roadmap for Semiconductors. SCM and SKPM permit the simultaneous acquisition of both electrical and topographical data, as mandated by the Roadmap, as the tip-cantilever is scanned over the semiconductor sample surface. Improvement in efficiency, repeatability, and data quality of SCM and SKPM are therefore desirable in the art.

Ultrasmall tips etched on silicon cantilevers have become a standard transducer for scanning force microscopy by virtue of their low force constant (approximately 1 N/m) and high resonant frequency (more than 10 kHz). The advent of the SKPM, described by M. Nonnemacher et al., "Kelvin probe force microscopy," Appl. Phys. Lett. vol. 58, no. 25, at 2921–23 (Jun. 24, 1991), and SCM, described both by J. Matey & J. Blanc, "Scanning capacitance microscopy," J. Appl. Phys. vol. 57, no. 5, at 1437–44 (Mar. 1, 1985), and by Williams et al., "Lateral dopant profiling with 200 nm resolution by scanning capacitance microscopy," Appl. Phys. Lett. vol. 55, no. 16, at 1662–64 (Oct. 16, 1989), has placed constraints on the durability and lifetime of such tips, especially in regard to spatial resolution of electrical features. In addition, SCM, SKPM, and STM require that the tip and cantilever be highly conductive.

Conventionally, the tip of a metallic wire made of metallic atoms of nickel, platinum, tungsten, iridium, or gold was used to form the probe tip for STM. The wire was typically 1 to 0.01 nm in diameter and electrolytically or mechanically polished and machined to a sharp tip of 0.1 $\mu$m in radius. See, e.g., U.S. Pat. No. 5,155,715 issued to Ueyema et al.; U.S. Pat. No. 5,509,300 issued to Chamberlin et al.; U.S. Pat. No. 5,065,103 issued to Slinkman et al.; and U.S. Pat. No. 5,357,109 issued to Kusumoto. And it is known to manufacture probes with a tip of less than 50 nm (0.05 $\mu$m) in radius of curvature and a cone angle ranging from 10 to 20 degrees at the tip.

Current art is to vacuum deposit a thin film coating or layer (typically 200 Å) of metal such as gold, chromium, or iridium onto a silicon tip, cantilever, or both to form the probe tip. With repeated use, however, especially when scanning over regions of high relief as occurs predominately when characterizing VLSI devices on a chip, the metal coating often flakes or wears off the tip. The metal on the tip will deform (i.e., flatten) in virtually all cases. Removal, wear, or deformation of the metal coating seriously degrades or destroys the ability of the tip to detect the desired electrical signal: capacitance, voltage, or current, respectively. Acquisition of electrical data becomes problematic given degraded sensitivity and, as the tip wears, the spatial resolution of the underlying topographic data also degrades. Reproducible data is difficult to achieve as a rule on deep submicron structures, such as VLSI devices. The conventional solution to these problems has been vacuum-deposit metalization.

Thus, although the advancing technology has addressed certain limitations in the art of scanning probe microscopy, certain disadvantages remain. To overcome the shortcomings of the prior art, the present invention is directed toward providing to the art of force microscopy an improved probe microtip able to produce high-resolution analysis of a surface, either conductive or non-conductive, at a tip distance which will not contact (through electric current or inadvertence) the surface under study. A further goal is to provide a tip which allows for measurement of both axial forces from a sample and multi-directional lateral forces, is effective in ambient conditions, is sensitive to small force gradients, and can be obtained using inexpensive laboratory instrumentation. An object of the present invention is to provide an improved tip which is more durable than previous tips and less susceptible to deleterious wear and deformation. A related object is to provide a tip which is more long-lived and stable than previous tips allowing, for example, experiments that require statistical treatment (and, therefore, data collection over an extended period of time). Still another object of the present invention is to provide a probe microtip with superior mechanical noise immunity by virtue of a higher effective force constant. Final objects are to provide a microtip which is highly conductive and to improve the electrical performance of such microtips.

SUMMARY OF THE INVENTION

To achieve these and other objects, and in view of its purposes, the present invention provides a micromechanical sensor probe for a scanned-probe tool comprising a silicon probe and a coating of a refractory metal silicide formed at least on the tip of the probe. Titanium silicide is preferred. A method for manufacturing such a probe includes the steps of, first, providing a silicon cantilever and tip combination and, second, forming a refractory metal silicide on at least the tip of the cantilever and tip combination. This second step of the method includes removing any remnant oxide from the tip, stabilizing the cantilever and tip combination on a carrier, depositing a refractory metal on the silicon tip, heating the cantilever and tip combination in an ambient free of oxygen to react chemically the refractory metal on and the silicon of the tip, selectively etching and removing any unreacted refractory metal from the tip, and annealing the cantilever and tip combination in an ambient free of oxygen. The method may also include, as a final step, removing any unreacted refractory metal from the tip.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice in the semiconductor industry, the various features of the drawing are not to scale. On the contrary, the dimensions of the various features are arbitrarily expanded or reduced for clarity. Included in the drawing are the following figures:

FIG. 2b is an enlarged view of the tip shown in FIG. 2a;

FIG. 13c is a line cut through the Kelvin voltage data of FIG. 13b, showing the quality and resolution afforded by the silicided probe tip of the present invention;

DETAILED DESCRIPTION OF THE INVENTION

A. The Silicided Tip

Figure 1:
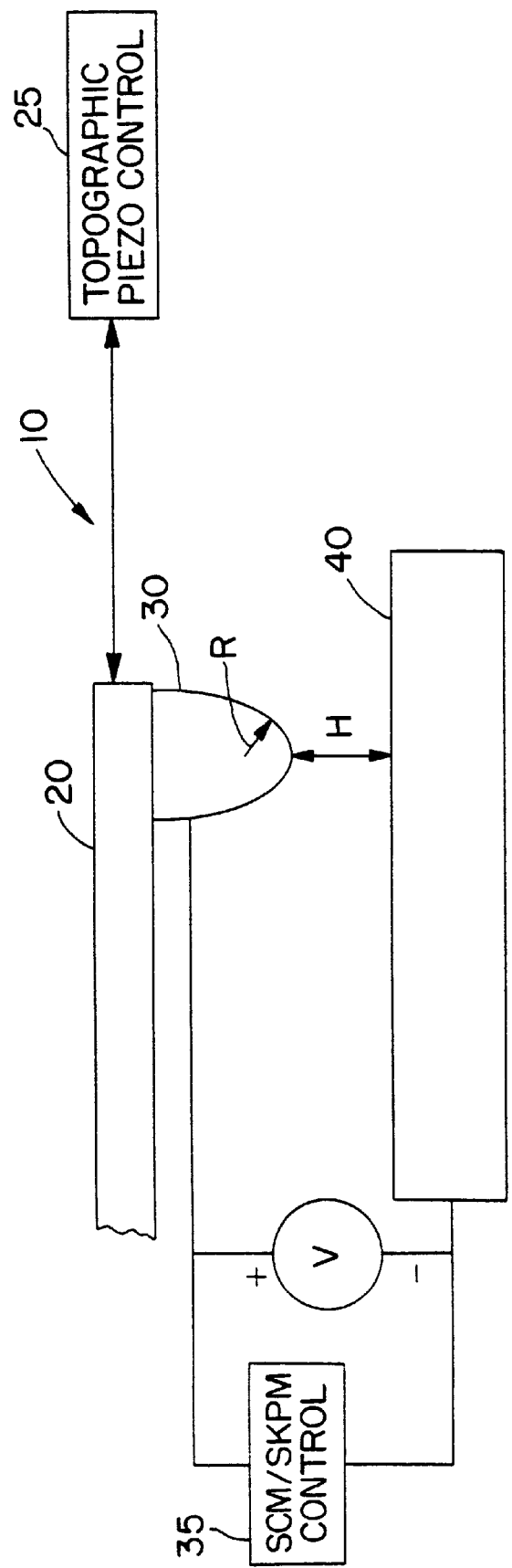
FIG. 1 is a simplified side view of the cantilevered tip portion of an atomic force microscope.

Referring now to the drawing, wherein like reference numerals refer to like elements throughout, FIG. 1 distinguishes between a cantilever, a tip, and a probe. The cantilever is the section of the force sensor which undergoes mechanical deflection. The tip is physically attached to the cantilever and forms the location of primary force interaction with a sample under investigation. The probe consists of both the cantilever and the tip. The cantilever deflects as a result of atomic van der waals forces between the tip and the sample when sensing topographic features on the sample in AFM mode, or as a result of electrostatic (coulomb) forces between the tip and the sample when sensing in SCM or SKPM mode.

Specifically, FIG. 1 is a simplified side view of the cantilevered tip portion 10 of a scanned-probe tool such as an AFM. The cantilevered tip portion 10 includes a cantilever 20, to which is attached an atomically sharp conductive tip 30 of radius of curvature R. Cantilever 20 forms a support body for tip 30. Tip 30 is positioned at a height H over the surface of a sample 40. Control of the tip-cantilever system in AFM mode is effected by means of topographic piezo control 25 as is well known in the art. Displacement of cantilever 20 is related to the van der waals forces between tip 30 and sample 40 or, in SCM (or SKPM) mode, by means of capacitance (or Kelvin voltage) feedback control 35, respectively. Because the AFM signal (vertical piezo displacement) and SCM or SKPM signals (capacitance or Kelvin voltage) are essentially independent, acquisition of data from both modes can be obtained simultaneously, as is well known in the art. The presence of the voltage V between tip 30 and sample 40 creates the electrostatic (coulomb potential) from which the capacitance or Kelvin voltage signal is derived, as is well known in the art.

Typically, silicon probes are made about 100 $\mu$m long by 20 $\mu$m wide. The tip has a radius of curvature R of about 20 nm when sharp and about 30 to 50 nm when dulled after many uses of after tip crashes. The probe may be all silicon; alternatively, the probe may have a silicon tip 30 coated with a film such as gold or aluminum to make it conductive, or with a film such as nitride ($Si_3N_4$) to make it stiffer for higher mechanical compliance. Single crystal silicon is the preferred embodiment for the cantilever-tip structure in the present invention, although it may be possible to fabricate a tip form polycrystalline silicon (poly).

The image created using the tool of an AFM is an accurate representation of the actual topography of the underlying sample 40 because the tip-cantilever is analogous to a stylus, albeit microscopic, that runs along the surface of sample 40. The topography is a map of the local van der waals potential, however, which defines the ultimate resolvable surface at the atomic scale. When the cantilevered tip portion 10 of the AFM encounters a resolvable feature on the surface of the sample 40, i.e., a feature at least larger in vertical extent than the radius of curvature of the tip R, tip 30 retracts or extends via piezo control 25. Thus, the AFM records the actual deflection of tip 30 along the vertical axis defined as the perpendicular to the direction over which the tip-cantilever scans over sample 40. Tip 30 may or may not actually touch the surface of sample 40, depending on whether the piezo control is operated in "repulsive" or "attractive" mode. The former mode is defined by a negative feedback piezo control whereby the tip-cantilever is forced towards the surface on sensing a locally repulsive van der waals force. Repulsive mode is also known in the art as "contact mode" or "tapping mode." "Attractive mode" is defined by a positive feedback piezo control whereby the tip-cantilever is forced away from the surface on sensing a locally attractive van der waals force. Because the van der waals force is strongly repulsive in closest proximity to the surface, it affords ultimately the highest spatial resolution, although the sample can be locally damaged as a result of the measurement.

One skilled in the art recognizes that the dimensions measured depend on how the shape of tip 30 changes over time. Even though tip 30 may not touch sample 40, tip 30 can wear down over time due to unintended tip crashes onto the sample surface or due to the integrated effects of nanometer scale van der waals tensile and compressive forces on tip 30. Thus, tip 30 does not remain "sharp" after prolonged use. Instead, tip 30 becomes rounded or deformed from its original shape, so that its contribution to the AFM image (or SCM/SKPM image) is different from the image produced by a new, unused tip. This change in the shape of tip 30 results in a change in the spatial resolution of the AFM (or SCM/SKPM). In the image generated from the tool, the shape of tip 30 is convolved with the topography (AFM), capacitance (SCM), or Kelvin voltage (SKPM).

A problem which has been experienced in testing integrated circuits involves wearing of the point of probe tip 30 during repeated contacts of the point with surfaces of the semiconductor wafers being tested. In probing a precise location on the surface of the semiconductor wafer, it is necessary, of course, that the point of tip 30 provide a small area which remains relatively constant in size during repeated probings. As the point of tip 30 begins to wear, the area on the integrated circuit that is contacted by the point may increase in size. This increase in size is undesirable because it destroys the accuracy of the probing operation in which only a specific location on the surface of the semiconductor wafer is to be contacted. For this reason, it is necessary to replace probe tips periodically as they wear.

The lateral resolution of an STM depends on how small the region of the sample is from which the tunneling current can flow which, in turn, is defined by the radius of curvature of tip 30. Moreover, when scanning a sample surface having a deep groove, a probe tip 30 with a broad cone angle cannot reach to the bottom of the groove and the tunneling current flows between the edges of the groove and the side face of the probe. Therefore, the trail of the motion of the probe does not reflect the shape of the sample surface. When the angle of tip 30 is narrower, tip 30 can reach to the bottom of the groove and the motion of tip 30 sufficiently reflects the shape of the sample surface. Thus, it is desirable that tip 30 have a small radius of curvature and a small cone angle. Conventional probe tips have a radius of curvature less than about 50 nm and a cone angle ranging from 10 to 20 degrees. Probes with tips of less than 50 nm in radius of curvature and with less than 10 degrees of cone angle are also possible. See, e.g., U.S. Pat. No. 5,357,109 issued to Kusumoto (disclosing a probe tip having a needle crystal, formed of tetrapod-shaped whiskers of zinc oxide, affixed to the end of a conductive fine wire via a metal-conductive material such as an alloy of indium or tin).

Tip 30 must have at least the following characteristics: (1) low electric resistivity, (2) ease of fabrication, (3) high temperature stability, (4) smooth surface features, (5) good corrosion resistance, and (6) excellent adhesion and low stress stability throughout subsequent high temperature processing. The conventional silicon tip fails to achieve all of these characteristics. The silicon tip could be coated with a metal such as gold. The relatively low melting and eutectic temperatures of metals would effect, however, all subsequent processes. The silicon could also be coated with a refractory metal such as tungsten (W), tantalum (Ta), or molybdenum (Mo). The refractory metals have adequately high melting temperatures, but their oxides are typically of poor quality, and in some cases volatile (e.g., molybdenum and tungsten oxides).

In the present invention, the conventional silicon of tip 30 is replaced by one of a group of refractory metal silicides ($MSi_x$) such as $WSi_2$, $TiSi_2$, $MoSi_2$, or $TaSi_2$. Refractory metal silicides can withstand much higher temperatures than aluminum and their eutectic temperatures with silicon are in excess of 1300° C. The following characteristics must be demonstrated so that the probe tip does not exhibit any undesirable properties during subsequent thermal processing: (1) the silicide must remain chemically stable; (2) the stress of the silicide film should not increase to unacceptably high levels; and (3) the resistivity of the silicide should not degrade. $MoSi_2$, $WSi_2$, $TaSi_2$, and $TiSi_2$ are capable of satisfying these criteria.

The resistivity values quoted for the refractory metal suicides in the Table below are for specific annealing times and temperatures. The resistivity values depend on many factors, including the method of formation and the stoichiometry and chemical purity of the compound. The table clearly points out the significant differences between the materials that depend upon the method used to form them. The lowest resistivity of the group (~13 $\mu\Omega$-cm) is achieved by $TiSi_2$ formed by direct metallurgical reaction. $TiSi_2$ achieves its minimum resistivity at an annealing temperature of about 800° C. The resistivity of polysilicon alone is 15–30 $\Omega$/sq.

Resistivity of Silicide Films Annealed at ≤1000° C. (in $\mu\Omega$-cm)

| Material | Metal + Poly-Si | Metal + Si Crystal | Co-Sputter | Co-Evaporation | CVD |
|---|---|---|---|---|---|
| TiSi$_2$ | 13 | 15 | 25 | 21 | 21 |
| TaSi$_2$ | 35 |    | 50 |    | 38 |
| MoSi$_2$ | 90 | 15 | 100 | 40 | 120 |
| WSi$_2$ |    |    | 70 | 30 | 40 |
| PtSi | 28 |    | 35 |    |    |

TiSi$_2$ is attractive because it exhibits the lowest resistivity of the refractory metal silicides and, because it can reduce native oxide layers, it is known to reliably form a silicide on both poly and single-crystal silicon by thermal reaction. Accordingly, TiSi$_2$ is the preferred silicide for use in the present invention. TiSi$_2$ is less stable than WSi$_2$ or MoSi$_2$ and titanium films have a high propensity to oxidize, however, requiring the silicide reaction to be conducted in ambients that are free of oxygen.

B. Silicided Tin Manufacturing Process

The silicides of interest can be formed by basically three techniques, each of which involve a deposition followed by a thermal step to form the silicide: (1) deposition of the pure metal on silicon (i.e., onto single crystal or polycrystalline silicon); (2) simultaneous evaporation of the silicon and the refractory metal from two sources (co-evaporation); and (3) sputter-depositing the silicide, either from a composite target, or by co-sputtering or layering. In the first technique, in which the metal is deposited by evaporation, sputter, or chemical vapor deposition (CVD), the direct metallurgical reaction of M+xSi→MSi$_x$ forms a well-adhered, stable, and durable silicide and is preferred for the present invention. When a refractory metal film is deposited directly on a silicon surface, and the wafer is subjected to heating, the metal and the silicon can react to form a silicide. Another advantage of this method of silicide formation is that it usually yields a lower resistivity than the other methods. When a silicide is formed by direct reaction, silicon is consumed. Care must be exercised, therefore, that sufficient silicon is available when using this technique.

The process of the present invention used to manufacture the silicided tip in described in detail below.

1. Provide A Standard, Etched Silicon Cantilever & Tip

The process begins by providing a standard, etched silicon cantilever and tip combination. Such conventional tip and cantilever combinations are taught by J. Brugger, R. Buser and N. deRooij, "Silicon cantilevers and tips for scanning force microscopy," Sensors & Actuators A, vol. 34, pp. 193–200 (1992).

2. Remove Oxide

Next, any remnant oxide present on the tip is removed by cleaning the tip using a 10:1, buffered hydrofluoric acid solution.

3. Stabilize Cantilever & Tip

Figure 2A:
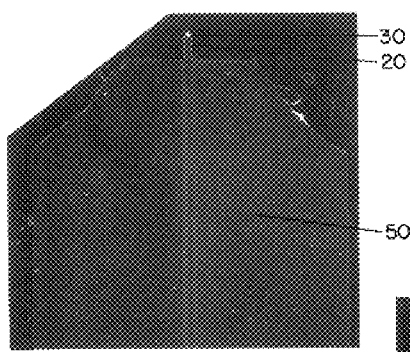
FIG. 2a, a microphotograph using a scanning electron microscope (SEM), illustrates, in a view from the top down, the cantilever and tip probe combination mounted on a carrier, with the silicon tip facing upward, in an early stage of the process of the present invention.
Figure 2B:
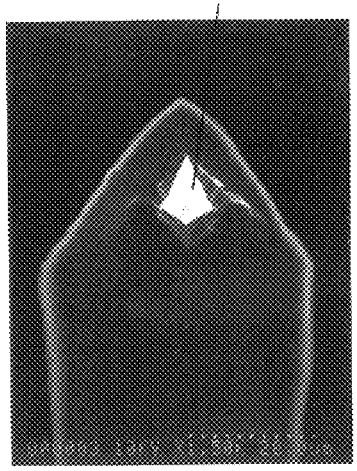
Figure 2C:
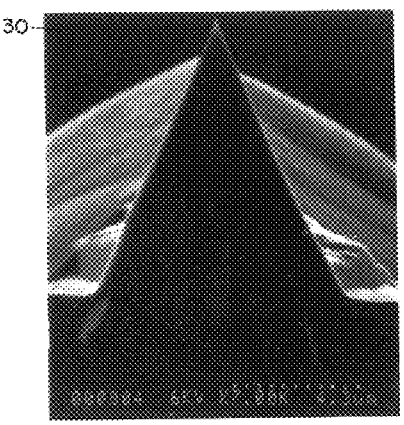
FIG. 2c further illustrates the tip in its bare, etched silicon state.

The cantilever 20 and tip 30 combination then is stabilized on a carrier 50 in preparation for mounting in a vacuum chamber. Carrier 50 is a relatively large (greater than 3 cm×3 cm square) silicon wafer about 2 mm thick. FIGS. 2a, 2b, and 2c illustrate the mounted combination. FIG. 2a shows, in a view from the top down, the mounted combination with the silicon tip 30 facing upward. FIG. 2b is an enlarged view of tip 30 shown in FIG. 2a, illustrating the pyramid shape of tip 30. FIG. 2c further illustrates tip 30 in its bare, etched silicon state. Any non-volatile glue or tape suffices to affix the cantilever 20 and tip 30 combination to carrier 50. A standard SEM carbon dot adhesive is suitable. Because a large number of cantilever 20 and tip 30 combinations can be affixed to one carrier 50 in practice, many tips can be processed simultaneously by the process of the present invention.

4. Deposit Refractory Metal

Figure 3:
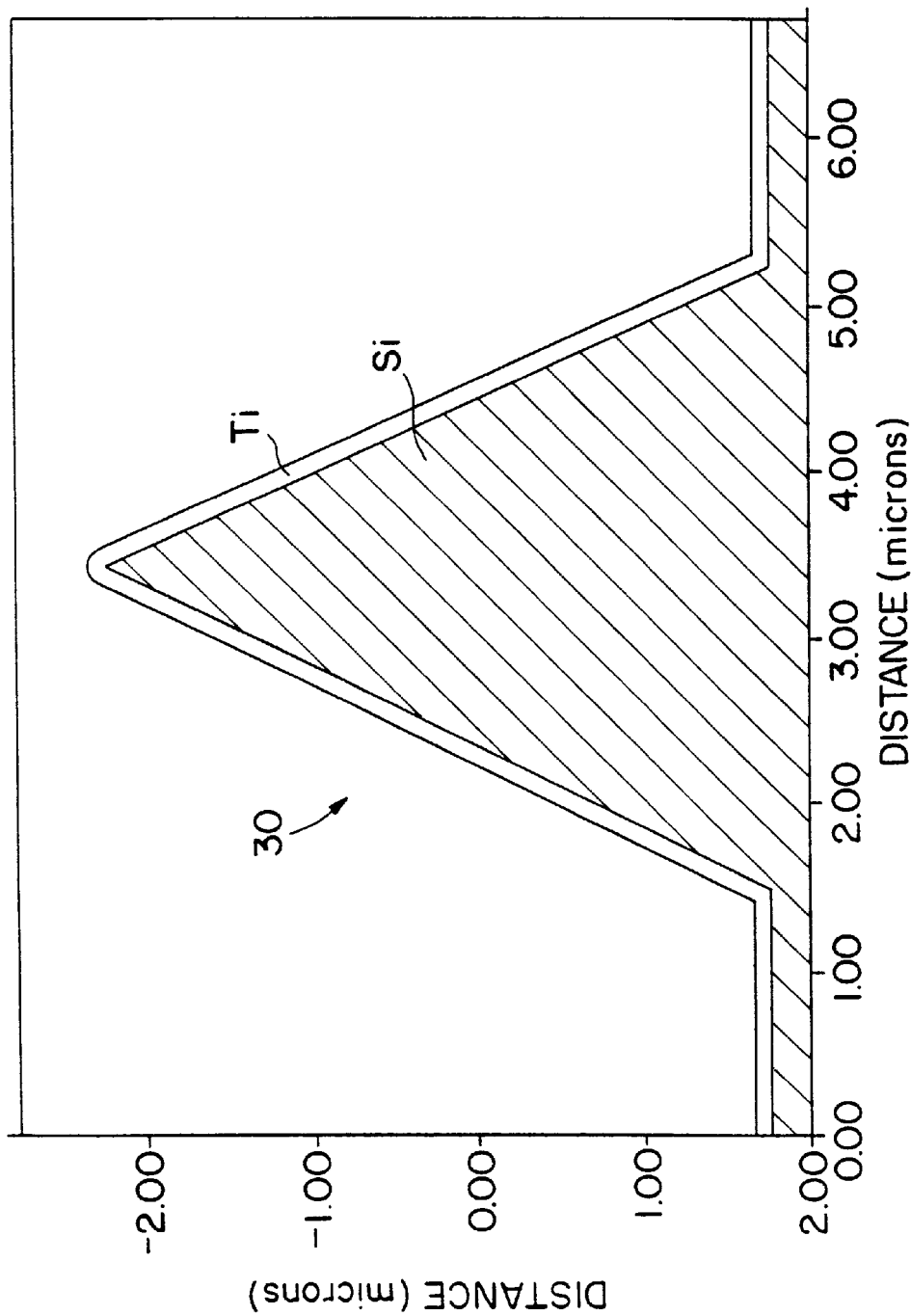
FIG. 3 is a computer simulation, created by a model of the formation of $TiSi_2$ on the tip as the process steps of the present invention are performed, showing the thickness of the titanium layer as deposited on a two-dimensional cross section of the silicon tip.

In the next step of the process, the refractory metal used to form the silicide is deposited. Preferably, a thin film (typically between 200 and 700 Å or 20–70 nm) of refractory metal (e.g., titanium) is deposited onto tip 30 in a 10$^{-6}$ torr or better vacuum. FIG. 3 is a computer simulation, created by a model of the formation of TiSi$_2$ on tip 30 as the process steps of the present invention are performed, showing the thickness of the titanium layer as deposited on the silicon tip. The thickness of titanium formed on a non-planar surface such as tip 30 will vary.

Figure 4:
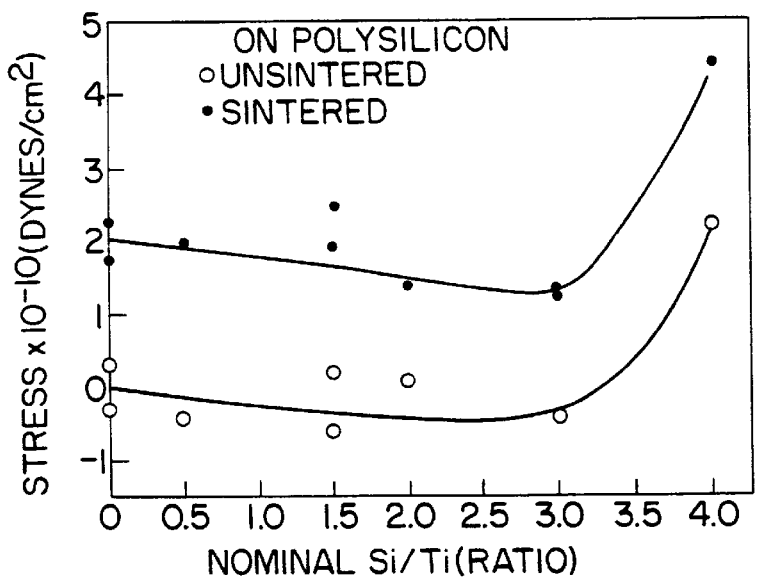
FIG. 4 shows stress measured at room temperature for $TiSi_2$ in both the sintered and unsintered conditions.

Note that stress affects the thickness of the titanium grown on the silicon. During the formation of suicides, there is a net volume shrinkage which may result in a large tensile stress in the film. This stress can cause delamination and other problems. Thus, the stress value in a silicide film is an important parameter. FIG. 4 shows stress measured at room temperature for TiSi$_2$ in both the sintered and unsintered conditions. Stress can result from differences in the thermal expansion coefficient of the film and the substrate as well as intrinsically from the structure of the film. For simplicity, FIG. 3 has omitted the effects of stress on the titanium thickness shown.

An insulating oxide can optionally be formed for use of cantilevered tip portion 10 in a scanning capacitance mode (SCM). A small partial pressure of O$_2$ can be introduced into the vacuum chamber during the titanium deposition. If so, an insulating layer of TiO will form on the underlying TiSi$_2$. In this case, a microcapacitor is formed on the tip, obviating the need to deposit an oxide on the sample to be measured in a scanning capacitance mode.

5. Anneal To Form TiSi$_2$ (C49 Phase)

Figure 5:
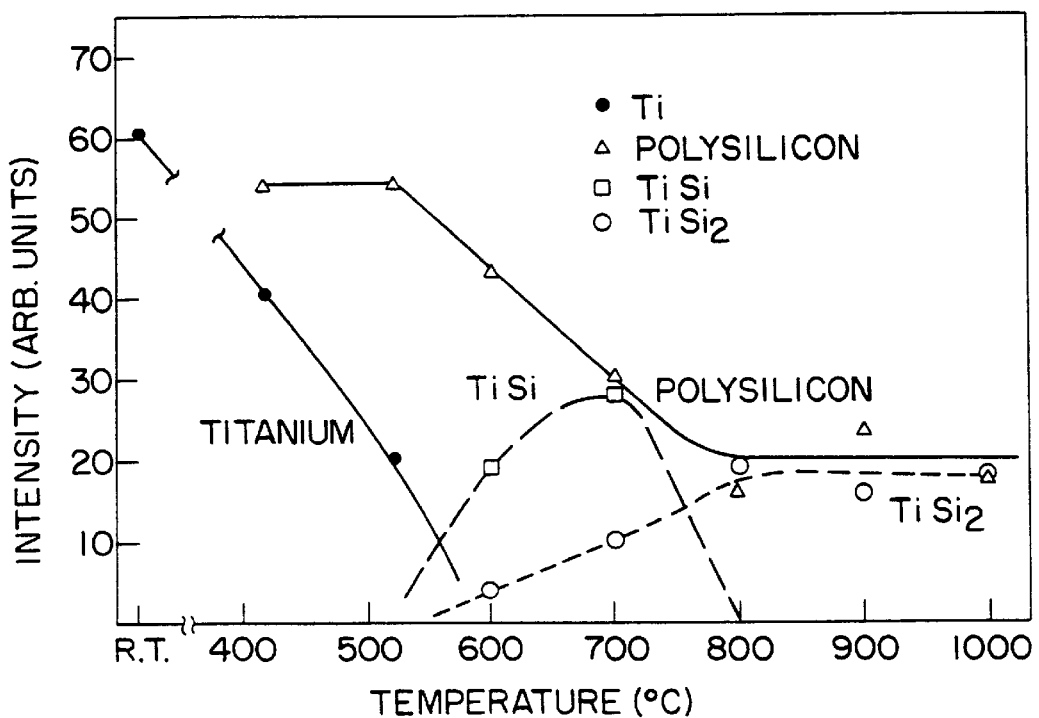
FIG. 5 is a graph illustrating the effect of temperature on the formation of TiSi and $TiSi_2$ and, more specifically, is a graph of X-ray diffraction intensities (integrated) of titanium, polysilicon, TiSi, and $TiSi_2$ as a function of vacuum sintering temperature.

For a metal film deposited on silicon, and annealed at relatively low temperatures, metal-rich silicides form first and continue to grow until the metal is consumed. Typically, at that point, the next silicon rich phase begins to grow. For example, FIG. 5 shows the effect of temperature on the formation of TiSi and TiSi$_2$. Above 600° C., no evidence of TiSi$_2$ exists, while TiSi begins to grow. The growth of TiSi peaks at 700° C., and the compound is not stable above 800° C. TiSi$_2$ begins to grow at 600° C., reaching a maximum at 800° C., and no more polysilicon is consumed above this temperature. After the complete conversion to TiSi$_2$, the system is stable. At 700° C. it takes approximately 60 minutes until the TiSi$_2$ has completely formed, while no silicide is detected even after 10 hours at 500° C.

Accordingly, in the next step of the process of the present invention, the silicon tip, with the refractory metal deposited, is heated. The heat treatment causes the silicide reaction to occur wherever the metal is in contact with the silicon. The silicon diffuses into the titanium at temperatures above about 600° C. Because titanium films have a high propensity to oxidize, the silicide must be formed in ambients that are free of oxygen. A two-step formation process has proven successful. During the first step, the temperature is kept at about 650° C.∓500° C. Either of two processes are suitable: (a) anneal the titanium-coated tips in argon (Ar) at 650° C. for at least 5 minutes or at 700° C. for at least 0.5 minutes to form the C49 phase of TiSi$_2$, or (b) anneal the titanium-coated tips in nitrogen (N$_2$) at 650° C. for at least 5 minutes or at 700° C. for at least 0.5 minutes to form the C49 phase to and an overlayer of TiN.

Thus, the anneal can be performed in argon or in nitrogen at 650 to 700° C. to form $TiSi_2$ (C49 phase). TiN can form over the $TiSi_2$ film as a result of the nitrogen ambient anneal. When annealing is performed in a nitrogen ambient, the titanium absorbs a significant amount of nitrogen (typically more than 20 at %). The nitrogen is absorbed preferentially at the titanium grain boundaries, which "stuffs" the grain-boundary diffusion paths. This reduces the diffusivity of silicon in the titanium. It is important that the nitrogen ambient contain fewer than 5 ppm of oxygen or water to avoid unwanted oxidation of the titanium film. TiN is conductive, although less conducting than $TiSi_2$, and is harder and more durable than $TiSi_2$. The TiN can optionally be etched as desired.

Figure 6:
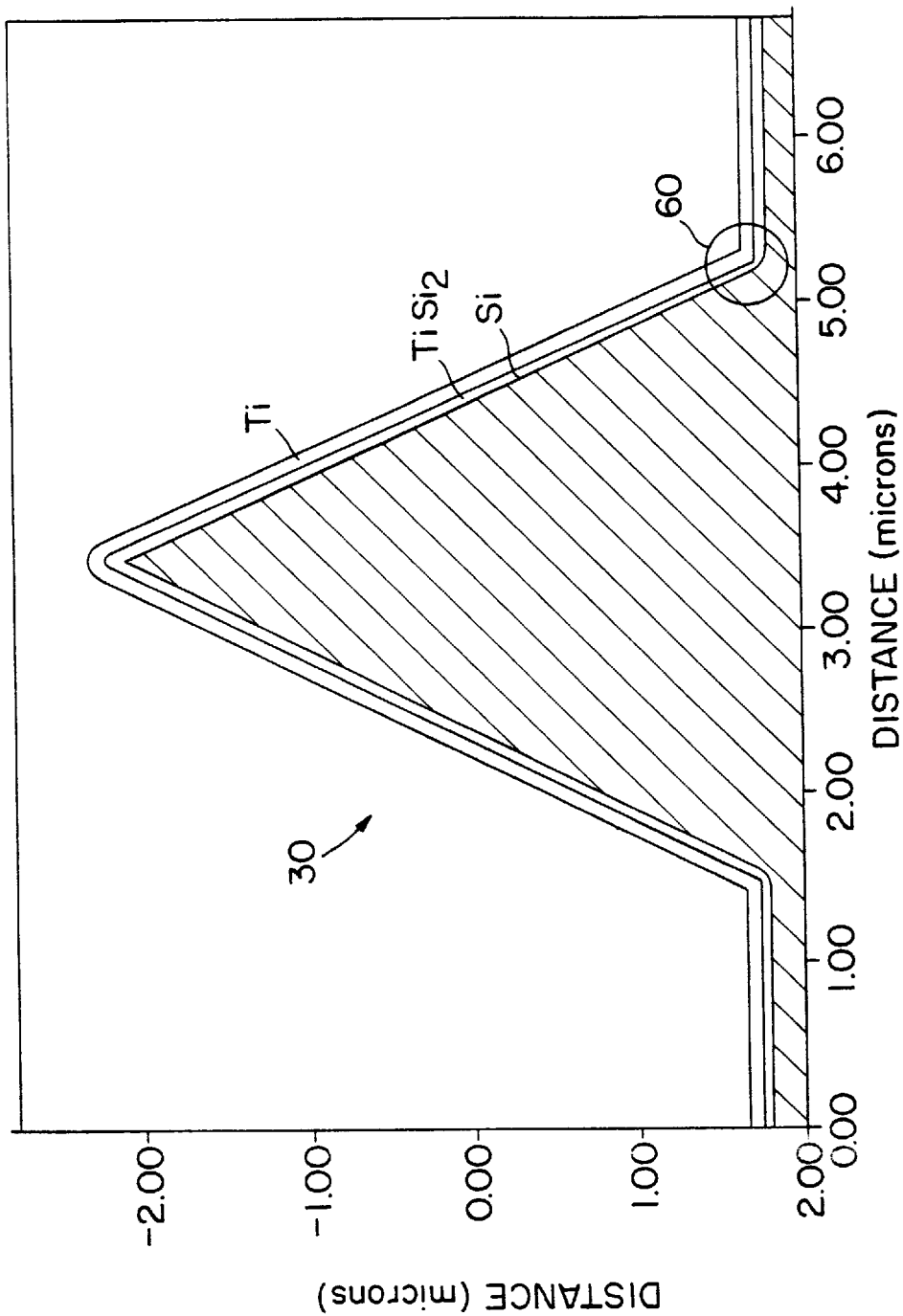
FIG. 6 is a computer simulation, created by the model of the formation of $TiSi_2$ on the tip as the process steps of the present invention are performed, showing the thickness of the $TiSi_2$ and titanium layers after the $TiSi_2$ (C49 phase) anneal in argon.

FIG. 6 is a computer simulation, created by the model of the formation of $TiSi_2$ on tip 30 as the process steps of the present invention are performed, showing the thickness of the $TiSi_2$ and titanium layers after the $TiSi_2$ (C49 phase) anneal in argon. Region 60 illustrates that the model which created the simulation of FIG. 6 has taken into account the effects of stress on the $TiSi_2$ and titanium thicknesses shown.

6. Anneal To Form $TiSi_2$ (C54 Phase)

After selectively etching and removing the unreacted titanium in a room temperature mixture of 5 parts distilled water ($H_2O$), 1 part hydrogen peroxide ($H_2O_2$), and 1 part ammonium hydroxide ($NH_4OH$), a (5:1:1) "Huang A" etchant, a second thermal processing step of about 800° C. is used to lower the $TiSi_2$ resistivity and to stabilize the $TiSi_2$ phase. Preferably, the samples are annealed at 800° C for 5 minutes or at 850° C. for 0.5 minutes in argon to convert the C49 phase the more highly conducting C54 phase of $TiSi_2$.

Once the $TiSi_2$ is formed and stabilized on tip 30, it can withstand temperatures above about 800° C. Because of instability of the $TiSi_2$ above about 900° C., however, all processing steps after silicide formation should be kept below about 900° C. All metal silicide films on polysilicon or single-crystal silicon appear to form $SiO_2$ by heating in a oxidizing ambient. The silicide film is generally unchanged. The oxidation process for silicides is presumed to consist of four distinct steps. These are: (1) diffusion of oxidizing species through the $SiO_2$ layer; (2) reaction at the silicide/oxide interface; (3) transport of silicon atoms relative to metal atoms in the silicide; and (4) reaction at the silicon/silicide interface, which releases silicon from the silicon substrate. $TiSi_2$ forms an oxide, but only in temperatures in excess of 900° C.

Alternative thermal processing steps may also be suitable. Rapid thermal processing (RTP) has also been used, for example, to effect silicide formation. $TiSi_2$ is formed by RTP at 600–850° C. in argon or in a furnace or by RTP at 800–850° C. in nitrogen (the specific reaction time depends on the temperature selected). After selectively removing the unreacted titanium, a stabilization anneal of 850° C. for 20–30 seconds in nitrogen is conducted to reduce the $TiSi_2$ resistivity.

7. Etch, If Necessary

Figure 7:
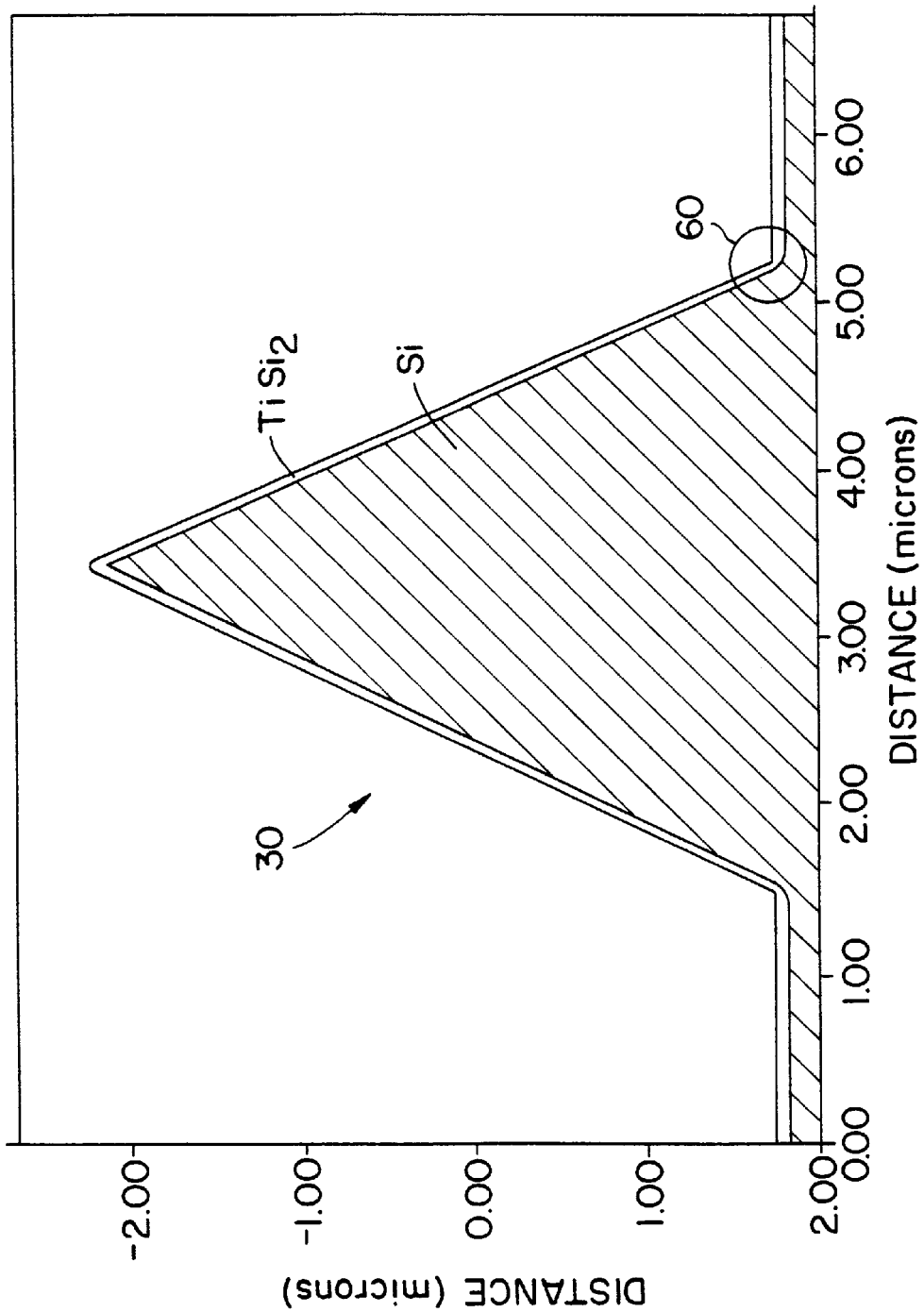
FIG. 7 is a computer simulation, created by the model of the formation of $TiSi_2$ on the tip as the process steps of the present invention are performed, showing the thickness of the $TiSi_2$ layer after the $TiSi_2$ (C54 phase) anneal in argon and after a remnant titanium etch—if necessary.

Finally, any unreacted metal (e.g., titanium) may be selectively removed from the surface of tip 30 using a chemical etchant that does not attack the silicide or the silicon substrate. A suitable etchant is 1 part ammonium hydroxide ($NH_4OH$), 2 parts hydrogen peroxide ($H_2O_2$), and 7 parts distilled water ($H_2O$). FIG. 7 is a computer simulation, created by the model of the formation of $TiSi_2$ on tip 30 as the process steps of the present invention are performed, showing the thickness of the $TiSi_2$ layer after the $TiSi_2$ (C54 phase) anneal in argon and after a remnant titanium etch—if necessary. As in FIG. 6, region 60 illustrates that the model which created the simulation of FIG. 7 has taken into account the effects of stress on the $TiSi_2$ thickness shown. Note that the $TiSi_2$ is thicker at the very end of tip 30 than at the corners of tip 30 when stress is accounted for in the model. This sharpening of the $TiSi_2$ formed at the corners of tip 30 is desirable because higher resolution is achieved in topography in AFM mode and higher electrical sensitivity (i.e., higher signal-to-noise ratio) is achieved in SCM and SKPM modes due to increased electric field strength at tip 30.

Figure 8A:
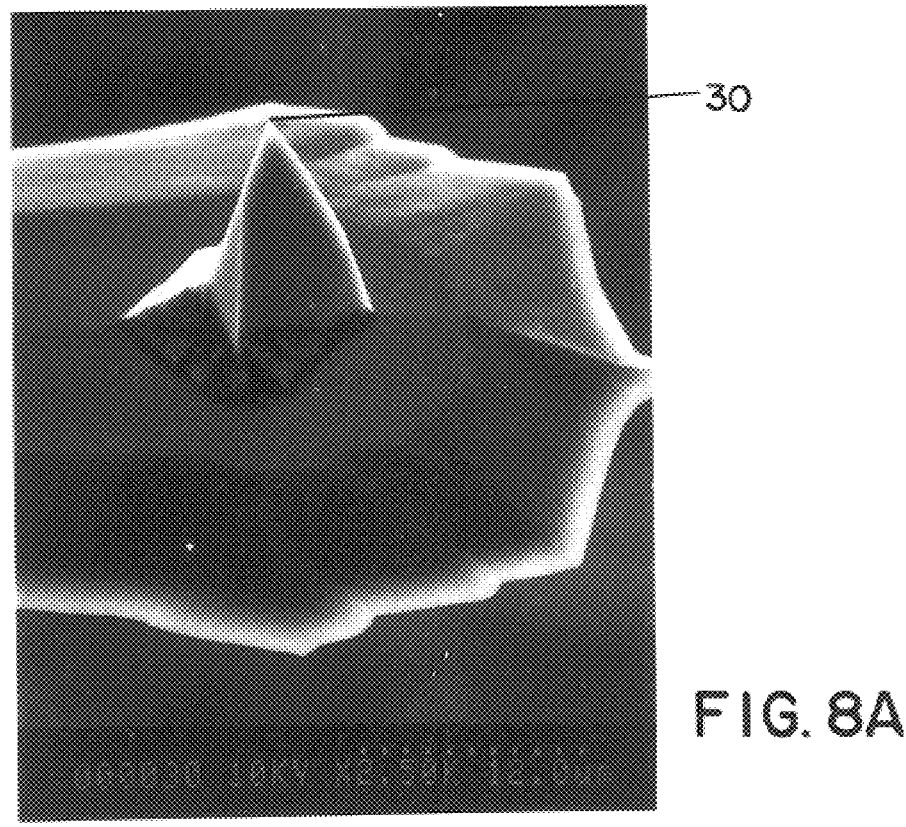
FIGS. 8a and 8b show SEM microphotographs of the silicided tip manufactured according to the present invention.
Figure 8B:
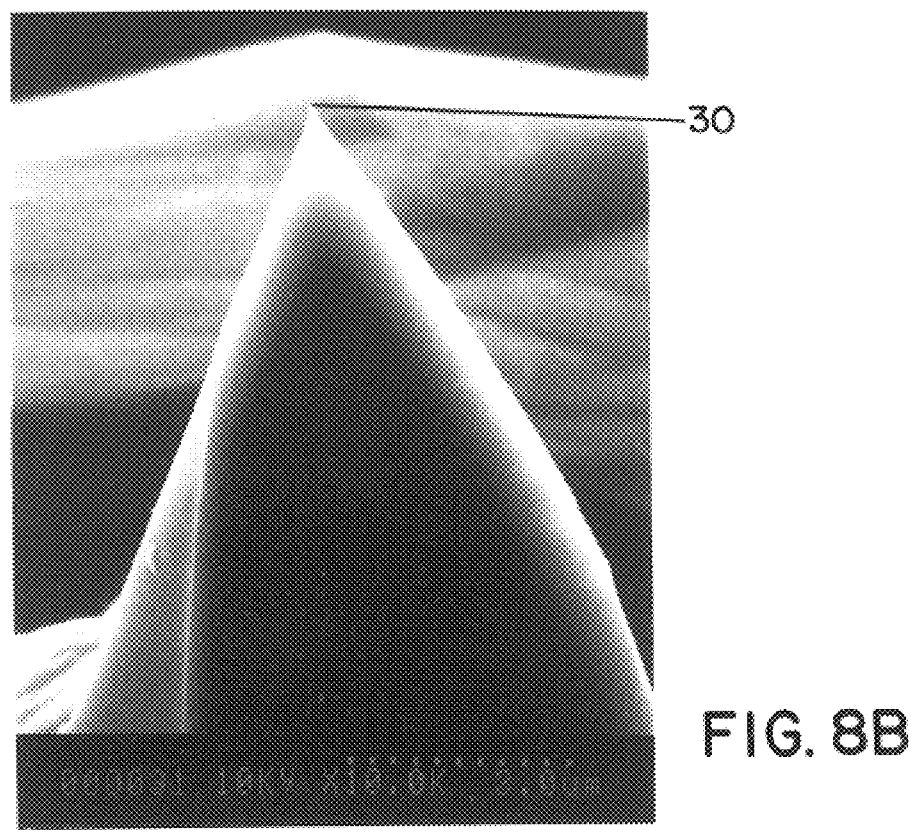

FIGS. 8a and 8b show SEM microphotographs of the silicided tip manufactured according to the present invention. A comparison between FIGS. 8a and 8b and FIGS. 2a, 2b, and 2c (which illustrate tip 30 in its bare, etched silicon state) shows the advantageous sharpening of tip 30 caused by the enhanced growth of the process of the present invention.

During the process of the present invention, the $TiSi_2$ grows into the silicon (i.e., silicon is consumed) to become an integral film layer at the surface of the matrix. This gives the film its superior adhesive property. The process of annealing the silicide forces cantilever 20 into mechanical compression, thereby raising the effective mechanical resonance of tip 30, which is desirable for higher resolution imaging. The silicide layer thus formed by growing into the silicon tip and cantilever forms a more rigid matrix than simple deposited metal coating. The silicided tip is thus more mechanically durable than a metal-coated tip, and will wear longer and deform less. Spatially, a high resolution electrical signal persists longer than for a simple, metal-coated tip.

C. Characteristics Of The Silicided Tip

In summary, the process of the present invention yields highly conducting tips which are much less susceptible to mechanical wear under repeated use than conventional tips. Not only are these tips much more long-lived, they also have superior mechanical noise immunity by virtue of the natural by-product of a higher effective force constant which results from the silicide formation process disclosed above. In addition, the electrical performance of these tips is superior due to the fact that the silicide forms an ohmic contact to the underlying, doped silicon, as opposed to a Schottky barrier. Tips have been successfully fabricated, using the process, which exhibit and embody the desired properties. Specifically, a ten-fold improvement in durability has been achieved over conventional tips. Conventional tips may permit two scans completed in less than a half day; tips manufactured pursuant to the present invention permit 15–20 scans over two-to-three days.

Figure 9A:
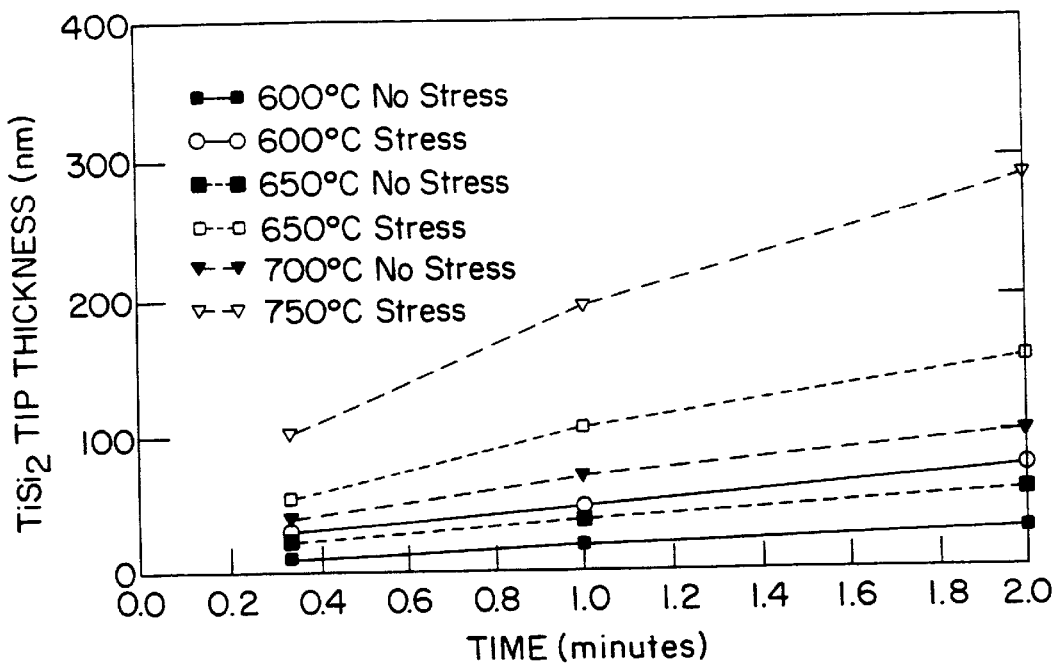
FIG. 9a is a graph, which plots the results of a computer simulation created by the model of the formation of $TiSi_2$ on the tip as the process steps of the present invention are performed, showing the thickness of the $TiSi_2$ at the end or tip area of the tip.
Figure 9B:
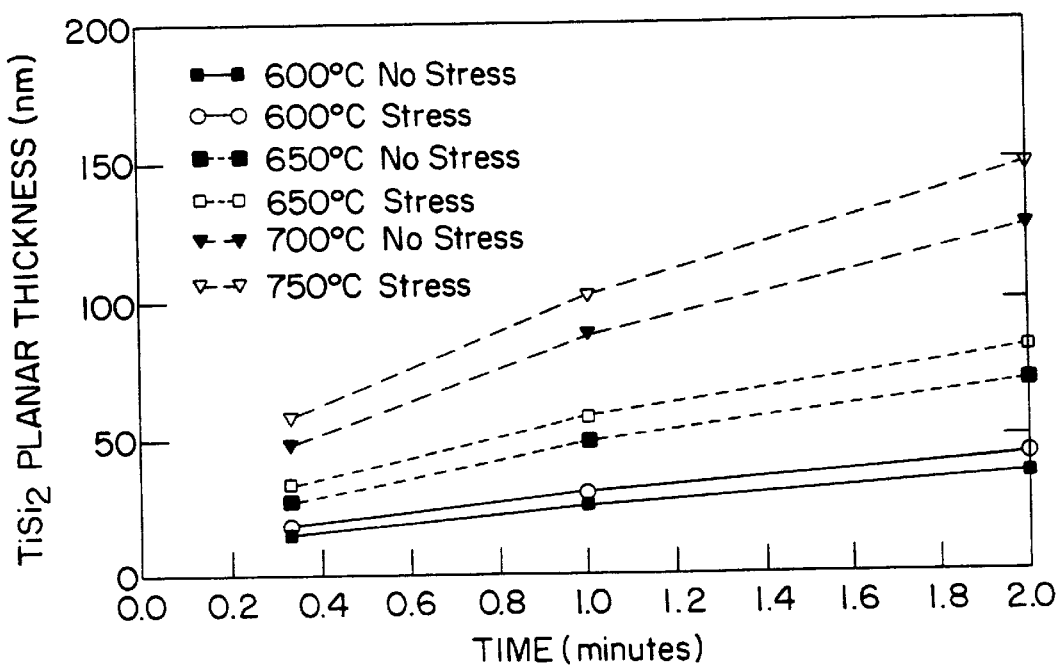
FIG. 9b is a graph, which plots the results of a computer simulation created by the model of the formation of $TiSi_2$ on the tip as the process steps of the present invention are performed, showing the thickness of the $TiSi_2$ in the planar area of the tip.

These and other advantages characteristic of the silicided tip of the present invention are apparent from the remaining figures. FIGS. 9a and 9b graph the results of a computer simulation, created by the model of the formation of $TiSi_2$ on tip 30 as the process steps of the present invention are performed, showing the thickness of the $TiSi_2$ at the end or tip (FIG. 9a) and in the planar (FIG. 9b) areas of tip 30. The thickness of the $TiSi_2$ formed depends upon time and temperature. In addition, the effects of stress on the $TiSi_2$ thicknesses are modeled, not modeled, or both modeled and not modeled at the temperatures (600° C., 650° C., 700° C., and 750° C.) considered. The data of FIGS. 9a and 9b were used to optimize the parameters adopted in the process of the present invention.

Figure 10:
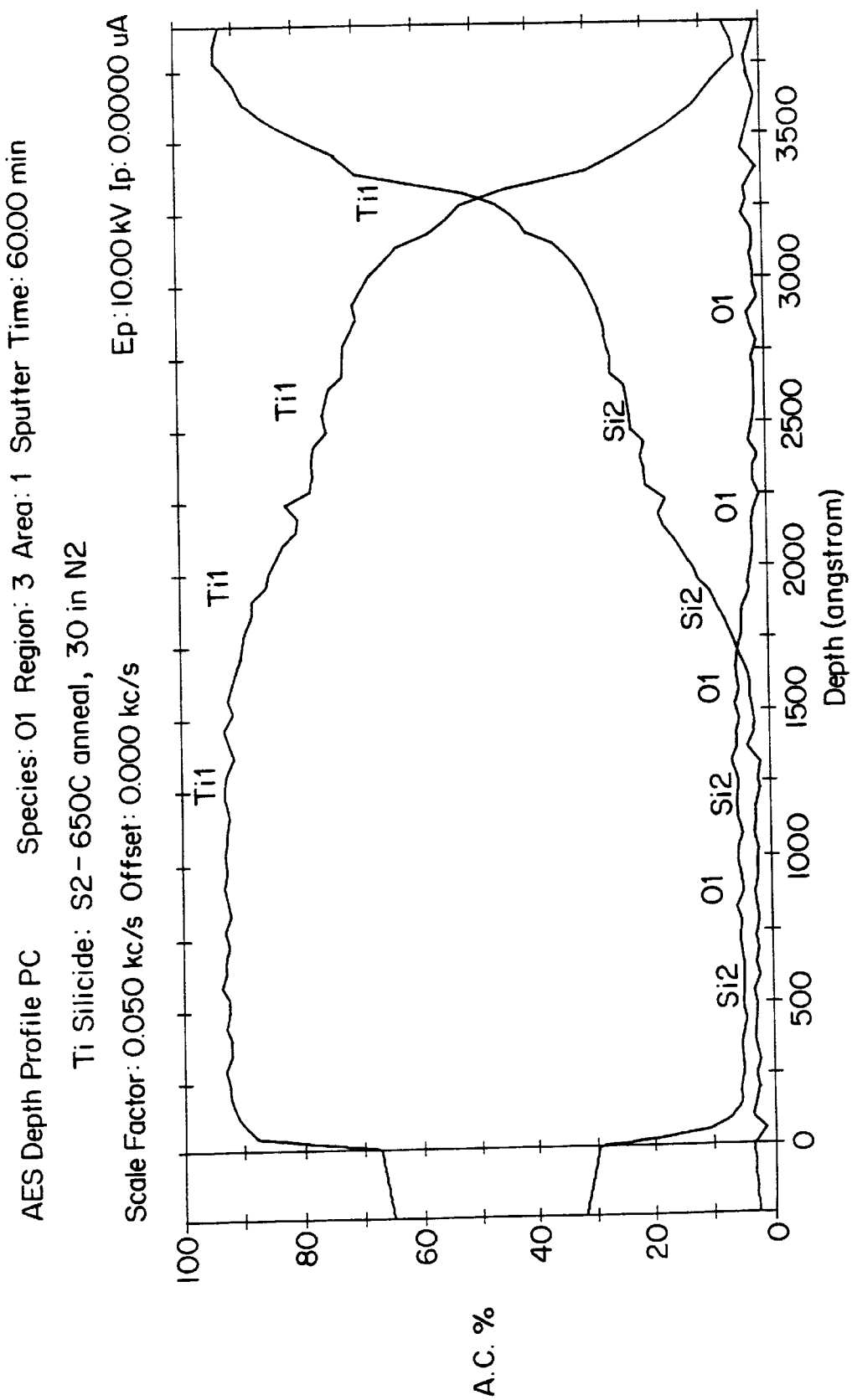
FIG. 10 is the vertical Auger spectra of the alloy species actually formed in the planar region of the cantilever according to the present invention.
Figure 11:
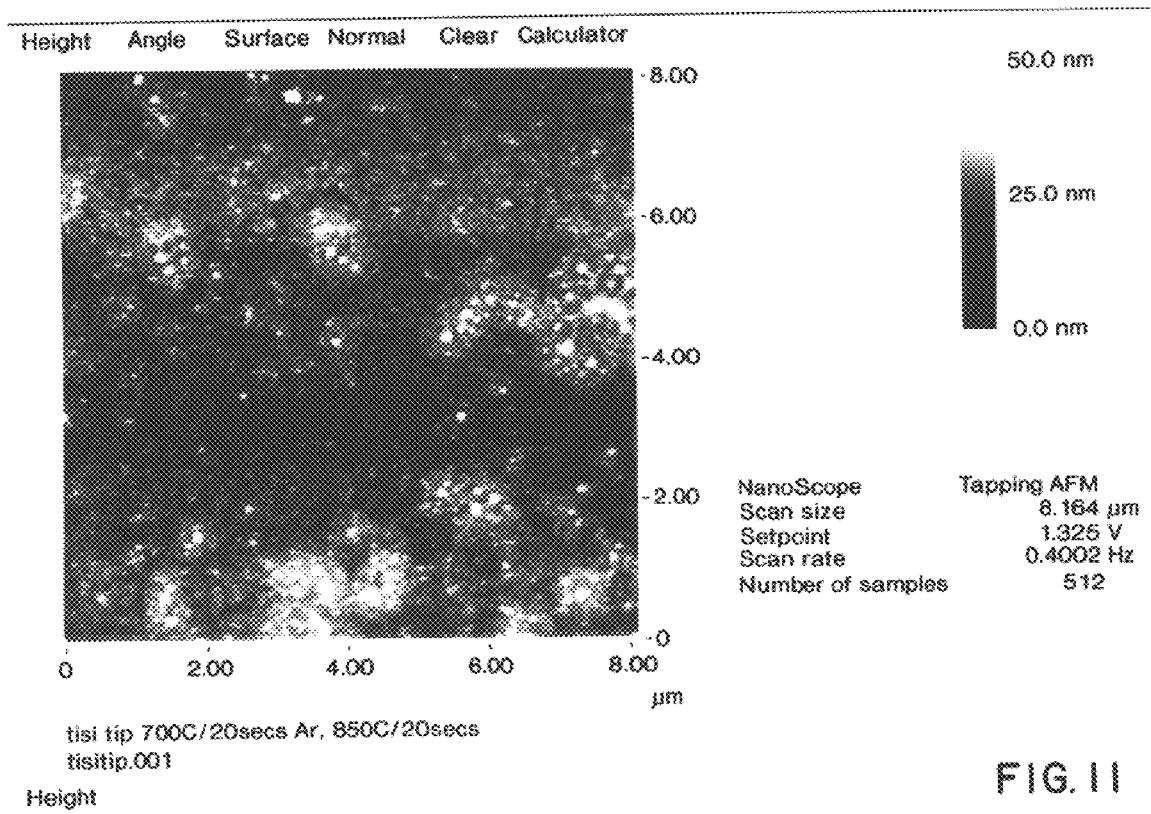
FIG. 11 is an AFM microphotograph of the $TiSi_2$ film formed on the planar region of the cantilever.

FIG. 10 is the vertical Auger spectra of the alloy species actually formed in the planar region of cantilever 20 according to the present invention. At a depth of between zero and about 2,200 Å, cantilever 20 is nearly all titanium. Depths between about 2,200 and 3,250 Å show a titanium alloy of TiSi$_x$, the C49 phase formed during the first anneal. The TiSi$_2$ silicide was formed at depths below about 3,250 Å. Thus, evidently 40 to 70 nm of TiSi$_2$ was actually formed on cantilever 20 in this particular case. FIG. 11 is an AFM microphotograph of the TiSi$_2$ film formed on the planar region of cantilever 20, demonstrating the quality and uniformity of the film.

Figure 12A:
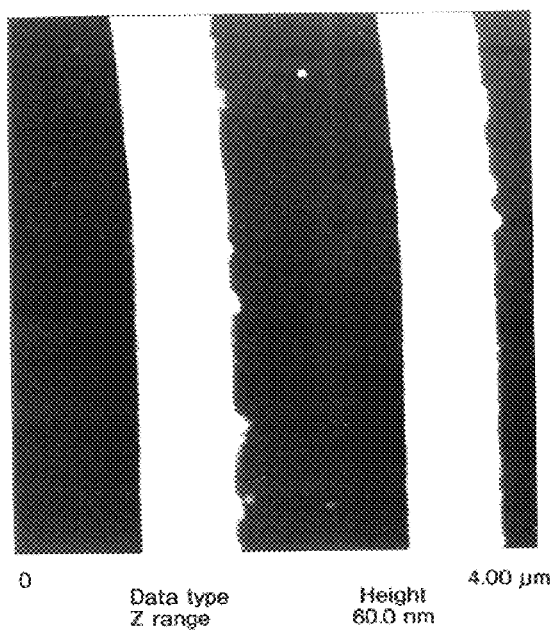
FIG. 12a is a plan view topographical image taken of a field effect transistor (FET) region stripped to silicon (i.e., a test doping structure) using a conventional metal-coated probe tip.
Figure 12B:
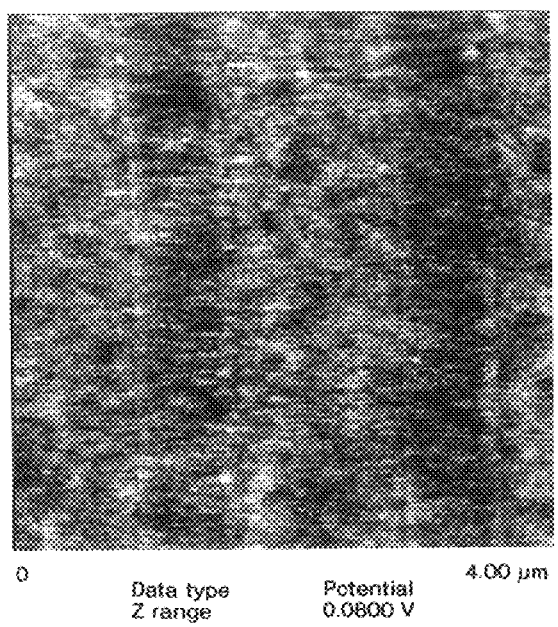
FIG. 12b is a plan view image taken of the test doping structure using the same conventional metal-coated probe tip used to produce FIG. 12a, showing the Kelvin voltage data from an SKPM and highlighting the doped regions of the FET.
Figure 12C:
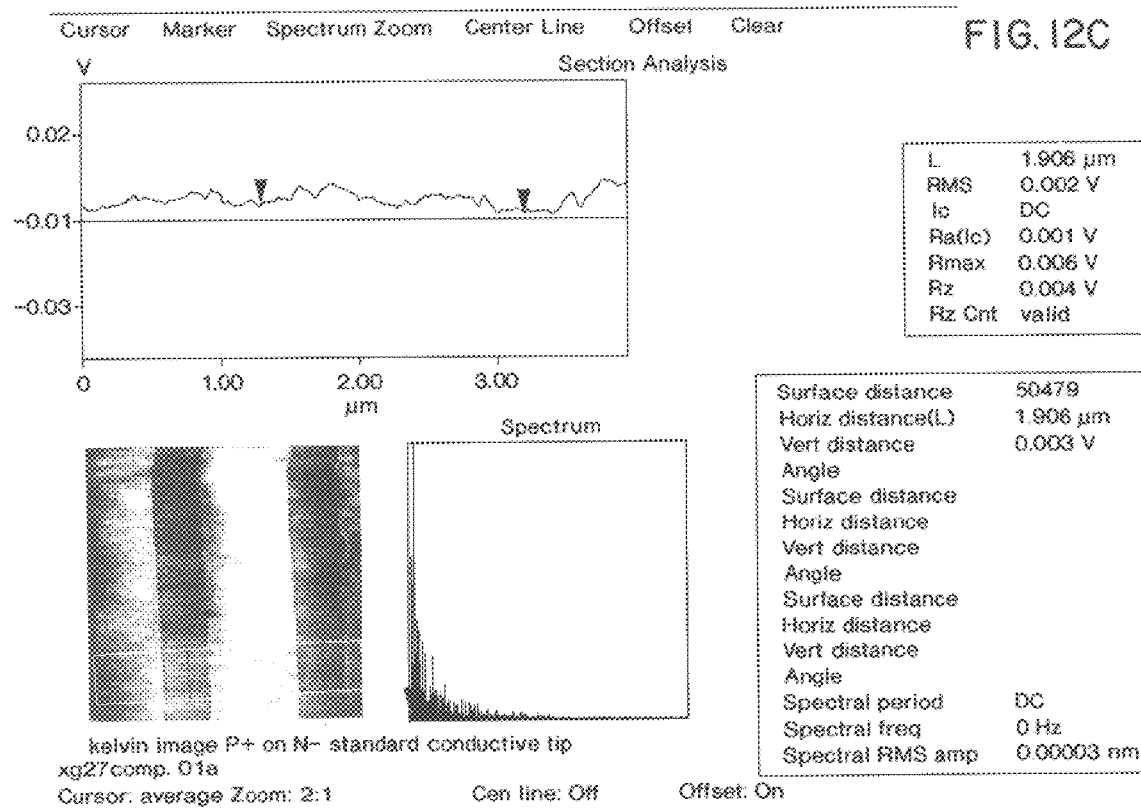
FIG. 12c is a line cut through the Kelvin voltage data of FIG. 12b, showing the quality and resolution afforded by the conventional tip.

FIG. 12a is a plan view topographical image taken of a field effect transistor (FET) region stripped to silicon (i.e., a test doping structure) using a conventional metal-coated probe tip. FIG. 12b is a plan view image taken of the test doping structure using the same conventional metal-coated probe tip used to produce FIG. 12a, showing the Kelvin voltage data from an SKPM and highlighting the doped regions of the FET. FIG. 12c is a line cut through the Kelvin voltage data of FIG. 12b, showing the quality and resolution afforded by the conventional tip. The arrows in FIG. 12c indicate the doped regions of the test structure.

A low signal-to-noise ratio is apparent.

Figure 13A:
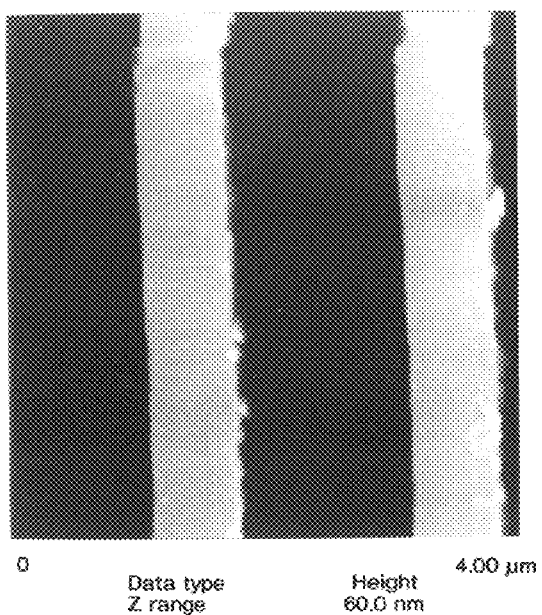
FIG. 13a is a plan view topographical image taken of the test doping structure using the silicided probe tip of the present invention.
Figure 13B:
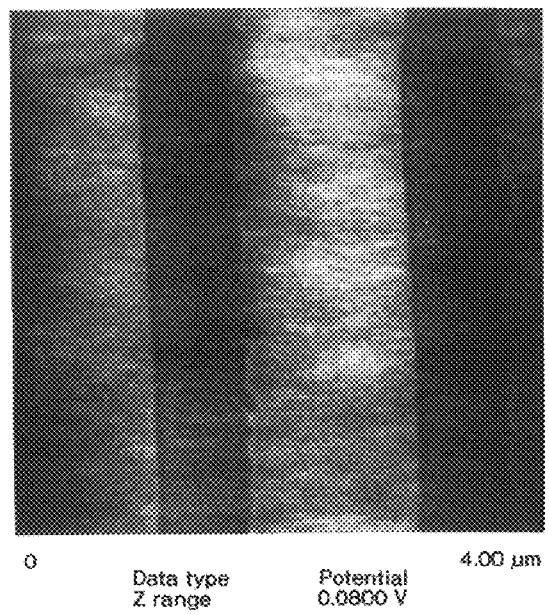
FIG. 13b is a plan view image taken of the test doping structure using the same silicided probe tip of the present invention used to produce FIG. 13a, showing the Kelvin voltage data from an SKPM and highlighting the doped regions of the FET.

Contrast FIGS. 12a, 12b, and 12c with FIGS. 13a, 13b, and 13c, respectively. FIG. 13a is a plan view topographical image taken of the test doping structure using the silicided probe tip of the present invention. FIG. 13b is a plan view image taken of the test doping structure using the same silicided probe tip of the present invention used to produce FIG. 13a, showing the Kelvin voltage data from an SKPM and highlighting the doped regions of the FET. FIG. 13c is a line cut through the Kelvin voltage data of FIG. 13b, showing the quality and resolution afforded by the silicided probe tip of the present invention. The arrows in FIG. 13c indicate the doped regions of the test structure. Equivalent improvement in the signal-to-noise ratio has been observed for SCM as well.

The contrast in the electrical image obtained using the silicided tip (FIG. 13b) is clearly superior to that obtained using the conventional tip (FIG. 12b). An improved signal-to-noise ratio also is apparent for the silicided tip (FIG. 13c) relative to the conventional tip (FIG. 12c). The signal strength and resolution are clearly better for the silicided tip of the present invention.

Figure 14A:
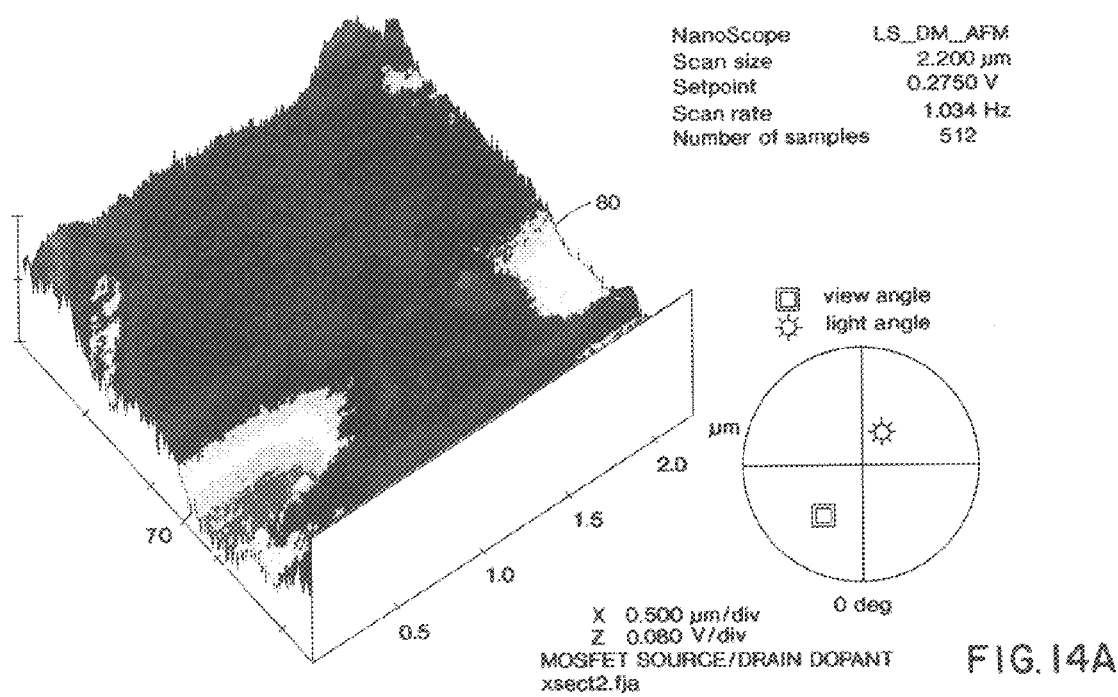
FIG. 14a presents two-dimensional dopant profile data of an actual MOSFET structure taken with the silicided probe tip of the present invention.
Figure 14B:
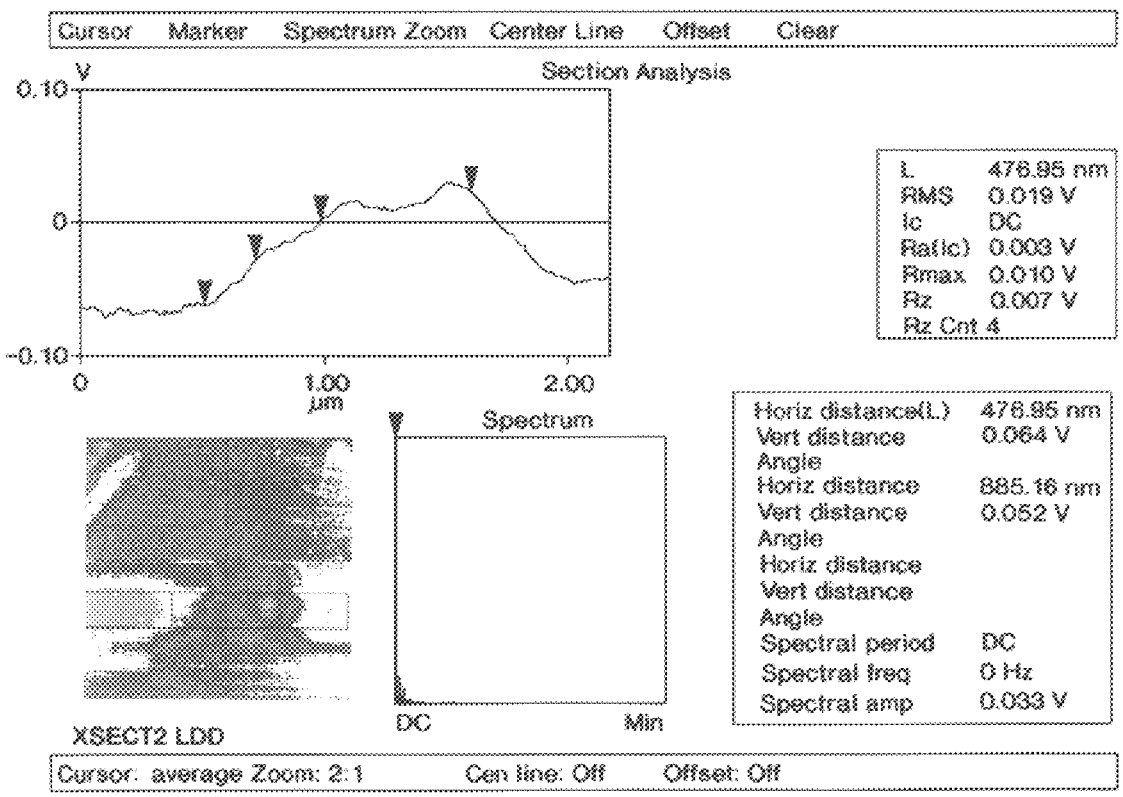
FIG. 14b is a line cut through the Kelvin voltage data of FIG. 14a, showing the quality and resolution afforded by the silicided probe tip of the present invention.
Figure 14C:
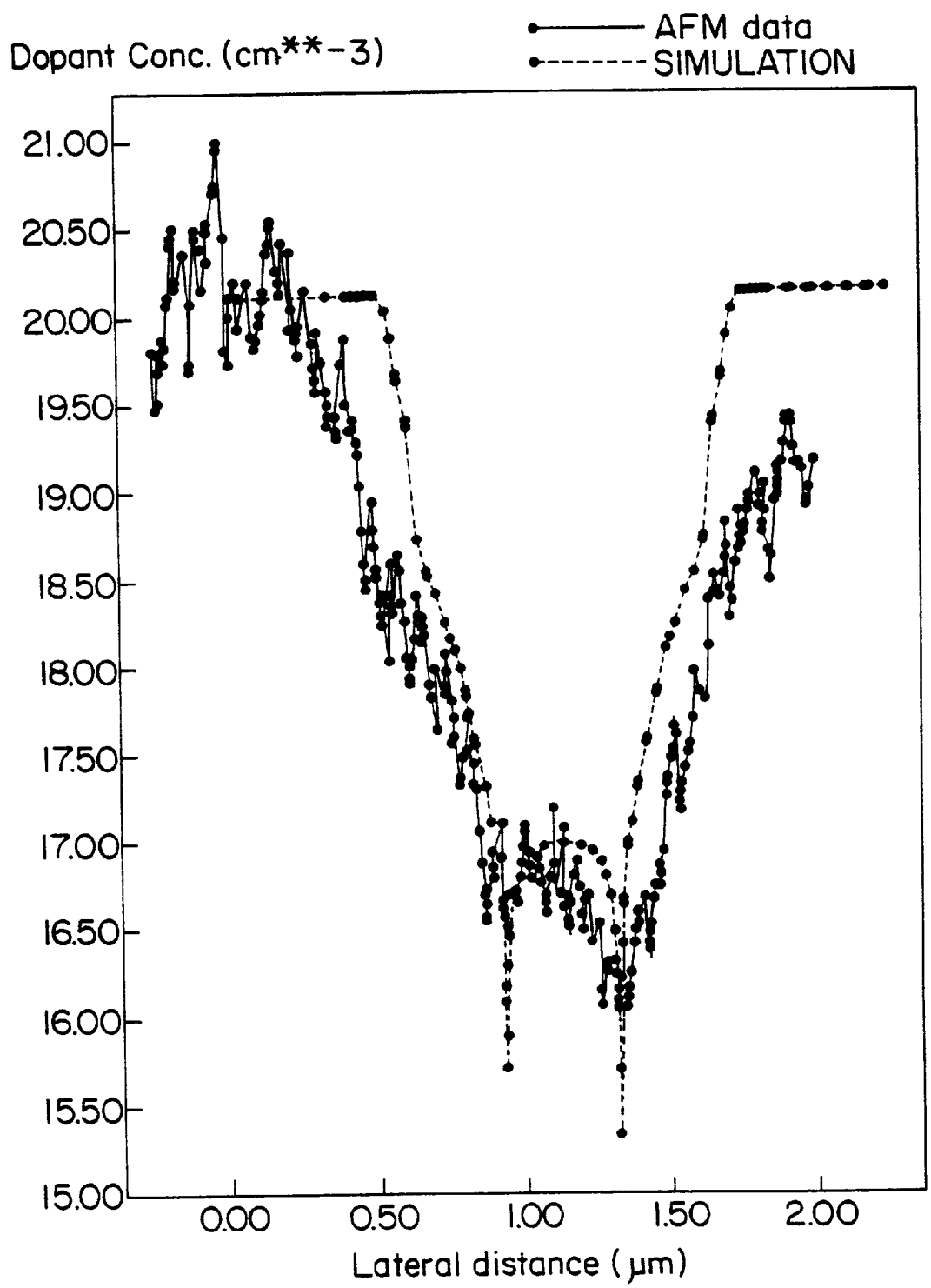
FIG. 14c is a graph comparing model predictions with the actual deconvolved Kelvin voltage data (i.e., dopant density) of the MOSFET structure obtained using the silicided probe tip of the present invention.

The significance of the silicided tip of the present invention, and of the method of the present invention used to manufacture that tip, is apparent from FIGS. 14a, 14b, and 14c. High-quality electrical imaging of structures is possible. FIG. 14a presents two-dimensional dopant profile data of an actual MOSFET structure taken with the silicided probe tip of the present invention. Area 70 is a source and area 80 is a sink. Both areas 70 and 80 are doped. FIG. 14b is a line cut through the Kelvin voltage data of FIG. 14a and, specifically, through areas 70 and 80 of FIG. 14a. FIG. 14b shows the quality and resolution afforded by the silicided probe tip of the present invention.

Finally, FIG. 14c is a graph comparing model predictions with the actual deconvolved Kelvin voltage data (i.e., dopant density) of the MOSFET structure obtained using the silicided probe tip of the present invention. The graph shows excellent agreement between the model predictions and the actual data. The data are deconvolved Kelvin voltage data of a lateral dopant standard fabricated in a CMOS2S process. The deconvolution yields dopant density. The significance of this type of characterization technique for advanced VLSI technology development will be readily apparent to those skilled in the art.

Although the invention has been described with reference to exemplary embodiments, it is not limited to those embodiments. Rather, the appended claims should be construed to include other variants and embodiments of the invention which may be made by those skilled in the art without departing from the true spirit and scope of the present invention.

What is claimed:

1. A method for manufacturing a micromechanical sensor probe for a scanned-probe tool comprising the steps of:
    (a) providing a silicon cantilever and tip combination; and
    (b) forming a refractory metal silicide on at least the tip of the cantilever and tip combination by:
        (b1) removing any remnant oxide from the tip;
        (b2) stabilizing the cantilever and tip combination on a carrier;
        (b3) depositing a refractory metal on the silicon tip;
        (b4) heating the cantilever and tip combination in an ambient free of oxygen to react chemically the refractory metal on and the silicon of the tip;
        (b5) selectively etching and removing any unreacted refractory metal from the tip; and
        (b6) annealing the cantilever and tip combination in an ambient free of oxygen.

2. The method of claim 1 wherein the step (b1) of removing any remnant oxide from the tip includes cleaning the tip with a 10:1, buffered hydrofluoric acid solution.

3. The method of claim 1 wherein the step (b2) of stabilizing the cantilever and tip combination on a carrier involves using a non-volatile one of a glue and a tape affixing the cantilever and tip combination to the carrier.

4. The method of claim 1 wherein, in the step (b2), a plurality of cantilever and tip combinations are stabilized on the carrier for simultaneous processing.

5. The method of claim 1 further comprising, during the step (b3) of depositing a refractory metal on the silicon tip, introducing a partial pressure of oxygen to form a microcapacitor on the tip.

6. The method of claim 1 wherein the refractory metal deposited in the step (b3) is titanium.

7. The method of claim 6 wherein at least about 20 nm of titanium are deposited.

8. The method of claim 6 wherein the titanium is deposited in a vacuum of at least $10^{-6}$ torr.

9. The method of claim 1 wherein the step (b4) of heating the cantilever and tip combination involves annealing the titanium-coated tip in argon at one of 650° C. for at least 5 minutes and 700° C. for at least 0.5 minutes to form the C49 phase of titanium silicide.

10. The method of claim 6 wherein the step (b4) of heating the cantilever and tip combination involves annealing the titanium-coated tip in nitrogen at one of 650° C. for at least 5 minutes and 700° C. for at least 0.5 minutes to form the C49 phase of titanium silicide and an overlayer of TiN.

11. The method of claim 1 wherein the step (b5) of selectively etching and removing any unreacted refractory metal from the tip applies a room temperature mixture of 5 parts distilled water ($H_2O$), 1 part hydrogen peroxide ($H_2O_2$), and 1 part ammonium hydroxide ($NH_4OH$).

12. The method of claim 6 wherein the step (b6) of annealing the cantilever and tip combination in an ambient free of oxygen involves subjecting the cantilever and tip combination to a temperature of about 800° C. for at least 5 minutes in argon.

13. The method of claim 1 wherein the step (b) of forming a refractory metal silicide on at least the tip of the cantilever and tip combination further includes (b7) removing any unreacted refractory metal from the tip.

14. The method of claim 13 wherein the step (b7) of removing any unreacted refractory metal from the tip applies an etchant of 7 parts distilled water ($H_2O$), 2 parts hydrogen peroxide ($H_2O_2$), and 1 part ammonium hydroxide ($NH_4OH$).

15. The method of claim 1 wherein the step (b) of forming a refractory metal silicide involves forming a refractory metal silicide on both the tip and the cantilever.

16. The method of claim 1 wherein the step (b) of forming a refractory metal silicide on at least the tip of the cantilever and tip combination yields a thicker coating of the refractory metal silicide on the free end of the tip than at the corner of the tip where the tip joins the cantilever.

17. The method of claim 1 wherein, in the step (b) of forming a refractory metal silicide on at least the tip of the cantilever and tip combination, the refractory metal silicide is formed directly on the tip, without any intervening insulating layer, along the entire length of the tip.

* * * * *